United States Patent [19]

Cardenas Franco et al.

[11] 4,367,087
[45] Jan. 4, 1983

[54] SYSTEM FOR CONTROLLING MOVEMENT OF ROTARY ARTICLE CONVEYING MECHANISM IN GLASSWARE FORMING MACHINES

[75] Inventors: Luis Cardenas Franco; David Figueroa Sanchez, both of Monterrey, Mexico

[73] Assignee: Investigacion Fic Fideicomiso, Monterrey, Mexico

[21] Appl. No.: 217,680

[22] Filed: Dec. 18, 1980

[30] Foreign Application Priority Data

Dec. 14, 1979 [MX] Mexico ................................. 180535

[51] Int. Cl.³ ............................................. C03B 9/40
[52] U.S. Cl. ....................................... 65/163; 65/29; 65/164; 65/DIG. 13
[58] Field of Search ................. 65/29, 163, DIG. 13, 65/164

[56] References Cited

U.S. PATENT DOCUMENTS 4,007,028  2/1977  Bublitz .................................... 65/163
4,108,623  8/1978  Cárdenas-Franco ................. 65/163
4,266,961  5/1981  Wood ............................... 65/163 X

Primary Examiner—Arthur D. Kellogg

Attorney, Agent, or Firm—Charles Richard Werner; William H. Maxwell

[57] ABSTRACT

Improved system for controlling the movement of rotary article conveying mechanism in IS glassware forming machines employing a reversing arm, operating mechanism for said arm to move same between a parison forming station and a blow molding station, said operating mechanism including a double action fluid driven actuator, solenoid controlled valves for the actuator, an arm position sensor, an actuator pressure sensor, a logic circuit receiving signals from the sensors, a digital valve responsive to signals from the logic circuit for fluid flow control from the actuator, a regulator controlling fluid pressure to the actuator, and a control panel containing digital indicators, mode switches and a mode indicator and a digital display for reception and transmission of signals to and from the logic circuit, the end result being the precise timing of reversing arm operation and elimination of impact at the end of reversing arm movement, with identical operational mechanism for the take-out arm, with the additional anti-shock safeguard by means of a pressure controlled damper set to a predetermined pressure to control the actuator upon failure of the normal actuator controlling elements.

12 Claims, 4 Drawing Figures

SYSTEM FOR CONTROLLING MOVEMENT OF ROTARY ARTICLE CONVEYING MECHANISM IN GLASSWARE FORMING MACHINES

BACKGROUND ART

Type IS machines for the manufacture of glassware articles are well known and have been widely used in the industry for a many years. It is also well known that such machines require the employment of an arm for transferring the parison, which is the intermediate shape produced in the manufacture of a glass article in more than one step, while being formed in a preforming station, transporting the parison to a blowmolding station, for which purpose a system means is provided for rotating the arm and reversing its position in such a way that the parison is inverted in the preform station, the parison being supported at the neck thereof by a crown fixed to the reversing arm whereby the parison reaches the blow molding station in an upstanding position in order to permit the two halves of the blowmold to close to terminate the operation of forming the glassware article.

The reversing mechanism of the type IS machine previously described includes an arm which rotates in the manner indicated to convey the parison from the preform station to the blow molding station and consequently upon reception of an adequate signal, to reverse the original position of the arm for reception of a new parison.

The movement of the reversing arm, both in the reversing movement which is critical, and in its reversing movement which is not critical inasmuch as in the latter movement the arm and its crown are empty, the movements thereof have been generally controlled only by the reception of a reversing starting signal, with no allowance or provisions being made use of or by adequate equation to avoid abrupt acceleration or deceleration which distorts the parison and makes it difficult to achieve a well formed product by blow molding. Also, such present day mechanisms in their reversing movement tend to impact at the end of such movement, that is, at its terminal position in the molding station, said impact seriously distorting the conveyed parison, damaging the mechanism, which in time makes it necessary to replace or adjust same.

Furthermore, although the reversing arm and crown in reversing movement may not be carrying a preform, the possibility of impact of the mechanism with the attendant damage or wear still exists thus shortening considerably the life of the mechanism.

The reversing mechanism of present day type IS machines is generally controlled by means of the well known timing drum which sends inverting and reversing signals at predetermined intervals in accordance with the type of article being manufactured in the machine, and thereby requiring the well known procedure of inserting cams in adequate positions on the timing drum, said cams operating pneumatic valves for transmitting signals to other pneumatic valves timed to operate the mechanism by fluid actuators.

Although electronic timing controls have been previously employed for operating machines for glassware forming, such electronic controls replaced the traditional timing drums and the inverting and reversing signals were transmitted by electronic timing controls to pneumatic valves or solenoid actuated valves operating the reversing mechanism for either inverting or reversing movement, without absolute control of said movement to prevent impact action of the mechanism and excessive acceleration and deceleration of the same, thus causing damage to the parison during inverting movement, and thereby affecting the quality of the final product, and simultaneously causing damage and/or wear of the mechanism because of improper deceleration by use of a control signal, rather than by employing a braking action when in a predetermined position. This has not eliminated the acceleration and deceleration and resultant impact forces.

Therefore, it is our contention that the control systems of past technology in this art have been quite inefficient, as operation of said systems did not result in a high quality glassware article nor in longer life of the mechanism.

The type IS machine for manufacturing glassware articles on the other hand, requires a take-out mechanism which removes the formed glassware article from the blow molding station prior to the opening of said mold, to carry the finished article to a dead plate on which the glass article cools and which is being transferred by an impulsing mechanism to a conveyer belt which will transport it to the next treatment station, as for example to an annealing furnace.

The takeout mechanism of the type IS machine heretofore described, includes an arm which pivots in a form similar to the arm previously mentioned with the difference that the takeout arm is provided with gripping mechanism to hold the neck of the glassware article formed by blowing, said gripping mechanism being synchronized with the movement of the takeout arm in order to pneumatically close the gripping mechanism about the neck of glassware articles carried by the forming station, thus enabling the takeout arm to swing with the glassware article until it is deposited on the dead plate which is adapted to cause the gripping mechanism to open pneumatically for releasing the glassware article and return the empty takeout arm and move it to the forming station preparatory to engaging another glassware article for repetition of the cycle.

The takeout mechanism of type IS machines is also controlled by means of the well known timing drum which is adapted to transmit takeout engage and takeout disengage signals at predetermined times according to the type of glassware articles being formed, the gripping mechanism being controlled in its open and closed position by a separate set of cams on the aforementioned timing drum in order to transport the glassware article from the forming station to the dead plate, and then by means of an adequate signal the takeout arm is reversed to return to the forming station for reception of another glassware article.

Movement of the takeout arm for conveying the article from the forming station to the dead plate is also very critical and should be performed by following the predetermined viscoelastic equation which eliminates breakage or distortion, while the mechanism tends to impact at the extremes of movement, as in the case of the inverting mechanism previously described.

These movements have not been controlled in prior art devices by application of the adequate viscoelastic equation, and the electronic control systems employed up to the present date employ only the timing drums, whereby the previous problems encountered relative to takeout mechanisms are quite similar to those described for inverting mechanisms for type IS machines for manufacturing glassware articles. Thus, all of the control systems for takeout mechanisms for type IS machines of the former technology have been very inefficient as to their effective operation toward achieving a high quality and low percentage of breakage of glassware articles produced, and at the same time achieving longer life of the mechanism.

BRIEF SUMMARY OF THE INVENTION

This invention relates to an improved system for controlling the movement of the rotary article conveying mechanism in type IS glassware forming machines in which a reversing mechanism is employed which comprises a reversing arm, a rotatable shaft carrying said reversing arm, said arm having one free end, a crown supported on said free end of the arm, a parison forming station and a blow molding station, said reversing arm moving between said stations and conveying the crown which carries a parison thereon; a takeout mechanism comprising a takeout arm carried on a rotatable shaft, a gripper mechanism vertically positioned on the free end of the takeout arm, a blow molding station and cooling and takeout stations between which said takeout arm conveys the grippers with the glassware article held therein, said grippers comprising a pinion secured to the rotatable shaft, a rack engaged by the pinion, a piston rod secured to the rack, a double action fluid driven actuator in which the piston rod is mounted and which is adapted to actuate the rack and pinion and consequently the reversing arm or the takeout arm between their two positions, and a position sensor to determine the position of said arms; pressure sensors connected to the fluid driven actuator, a logic circuit adapted to receive signals from the sensors, a control panel carrying digital indicators and switches, and operation mode indicators, and also a digital display for reception and transmission of signals to and from the logic circuit, solenoid control valves for the fluid actuator, a fluid actuated damper connected to the fluid conduit of said actuator to absorb the shock of the piston under reversing or other conditions; a digital valve adapted to select a predetermined number of openings connected to the discharge end of the fluid actuator for the purpose of controlling the fluid flow in the exhaust line in response to the signals from the logic circuit in accordance to the position of the piston and the fluid pressure in the actuator; and a pressure regulator to control the fluid pressure in the intake conduit to the actuator.

OBJECTS OF THE INVENTION

Keeping in mind all of the imperfections of movement control systems for rotary conveying mechanism of glassware articles in the art to date, it is a principal object of the invention to provide a rotary control system for inverting and takeout arms for type IS machines for manufacturing glassware articles which is of a simple construction, and of a high efficiency for controlling the movement of articles through a viscoelastic equation in order to reduce to a minimum or eliminate the stresses on the article being conveyed, avoiding violent accelerations and decelerations, as well as impact of the mechanism at the extremes of movement.

It is another object of the present invention to provide a movement control system for rotary conveying mechanisms of glassware articles, of the type hereinbefore mentioned, which allows the regulation of the fluid exhaust from the pneumatic actuator, which actuates the rotative fluid exhaust from the pneumatic actuator, and which actuates the rotative mechanism for the arms by means of logic signals to open or close the discharge by means of a predetermined viscoelastic equation.

It is another object of the present invention to provide a movement control system for rotary conveying mechanism for transporting glassware articles, according to what has been previously described, which makes the movement of the mechanism by the signals transmitted by a plurality of sensors of the state of the mechanical and pressure sensors in the fluid operated actuator in order to regulate the discharge of fluid in a very strictly controlled manner in accord to actual movement of the mechanism.

Another object of the present invention is to provide a movement control system of the type hereinbefore mentioned which achieves conveying movement of the glassware article without damaging the same and doing so in a minimum of time.

Another particular object of the invention is to provide a movement control of the type previously described which can be operated by means of a logic circuit which forms an integral part of the electronic control system for the machine for manufacturing glassware articles, or by means of a separate logic circuit not part of the electronic control, and for machines which are not operated by an electronic control.

Still a further object of the present invention is to provide a movement control system of the type hereinbefore described which functions to also control the return movement of the conveying mechanism for conveying glassware articles in a machine therefor, providing for the shortest possible conveying interval without impact of the mechanism at the end of its movement following essentially a predetermined cycloidal and fixed profile in the logic memory.

BRIEF DESCRIPTION OF THE DRAWINGS

The construction and method of operation of our invention will be better understood by reference to the following description in conjunction with the accompanying drawings in which.

DETAILED DESCRIPTION OF THE INVENTION

Figure 1:
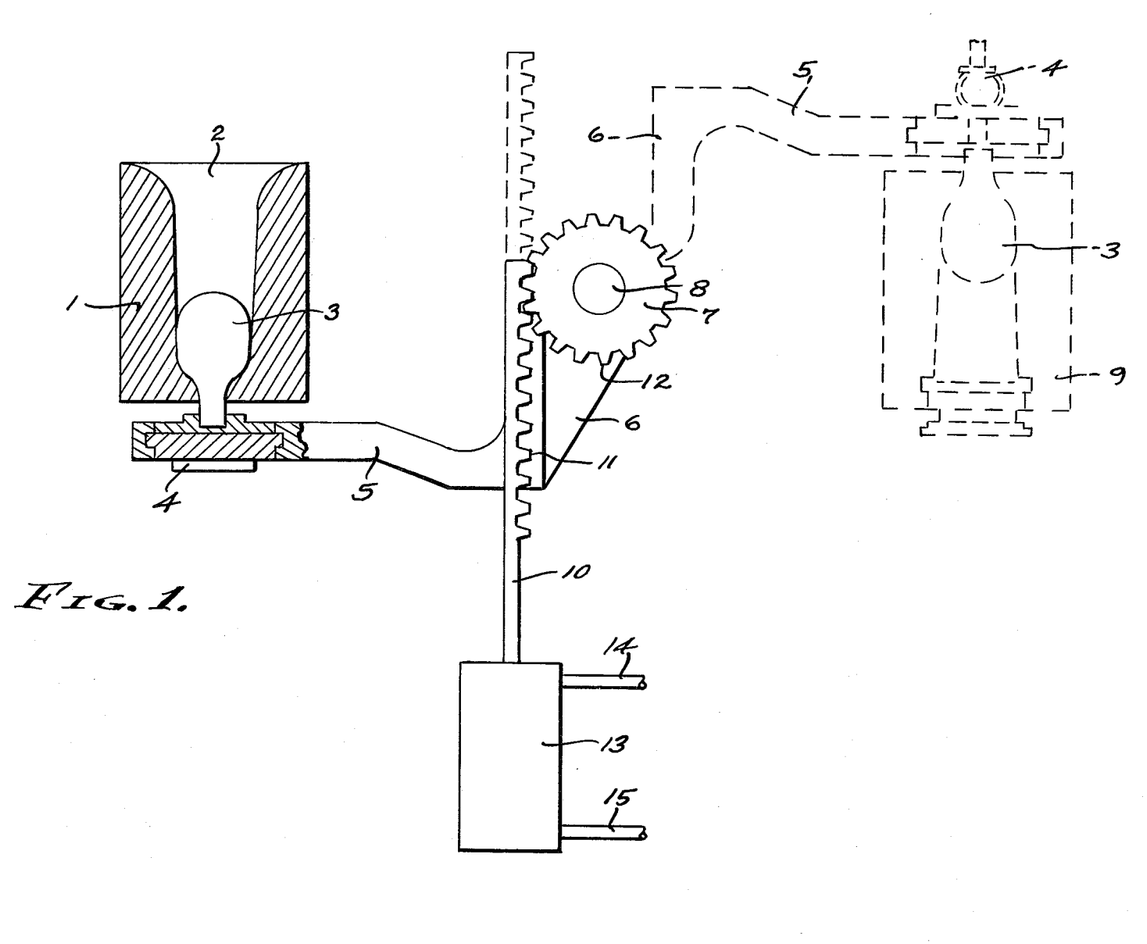
FIG. 1 is a fragmentary elevation view, with parts being shown in section and in diagrammatic form of an inversion and reversing mechanism of a type IS machine for forming glassware articles which includes the regulating mechanism for the control system of the present invention and in which is illustrated in dotted lines the inverted position of the inverting arm.

Referring now to the drawings and in particular to FIG. 1, in which is shown an inverting mechanism for the type IS machine for forming glassware articles of well known configuration and which is comprised generally of a blank mold 1 having a cavity 2 which is opened vertically, and in which a glass gob is fed by well known apparatus (not shown) to form a parison 3 in the blank mold 1, in such a manner that the glass gob is fed downwardly into the crown 4 which forms the neck of the glassware article to be formed, and which is shown fixed at the end of an inverting arm 5, which, by means of a bracket 6 is secured to the pinion 7 carried by shaft 8 to which is imparted the inverting movement by swinging of arm 5 around the shaft 8, moving from the position shown by full lines in FIG. 1 of the drawings, in which the inverting arm 5 and the crown 4 are under the blank mold 1 in the preforming station, until reaching the position marked by dotted lines in FIG. 1 of the drawings, where the parison 3 is supported by crown 4 and the arm 5, and is placed in the blowforming station.

Actuation of the inverting mechanism of a type IS machine of the well known type is achieved by provision of teeth 12 on pinion 7 secured to shaft 8, said pinion 7 meshing with rack 11 carried by piston rod 10 of fluid actuator 13 provided with fluid inlet and outlet 14 and 15 respectively.

After the parison 3 is formed in blank mold 1, which is comprised of two mating halves of the mold, the inverting mechanism is operated to leave the parison 3 supported freely by its neck on the crown 4 at the end of arm 5, and then by sending a signal for inverting, the fluid actuator 13 drives the rack 11 and intermeshed pinion gear 7 for inversion of the reversing arm 5 to place the parison 3 in the blow molding station in order that the parison 3 is in the proper position for reception by the blow mold 9, as illustrated in FIG. 1 of the drawing. Said blow mold is generally formed of two halves of the mold which close once the parison 3 has been placed in the position marked by dotted lines in FIG. 1. Also, in the process of forming the glassware article in the blow mold 9, the crown 4 is opened in response to reception of a second signal from the timing mechanism of the machine, and a new reversing signal is received by fluid actuator 13 which reverses its action to move the rack 11 and teeth 12 of pinion 7 which rotates about the shaft 8 thus reversing the arm 5 and the crown 4 to move the same to their original position in the preforming station, whereby closure is accomplished in the blank mold 1 to repeat the cycle of the machine.

Figure 2:
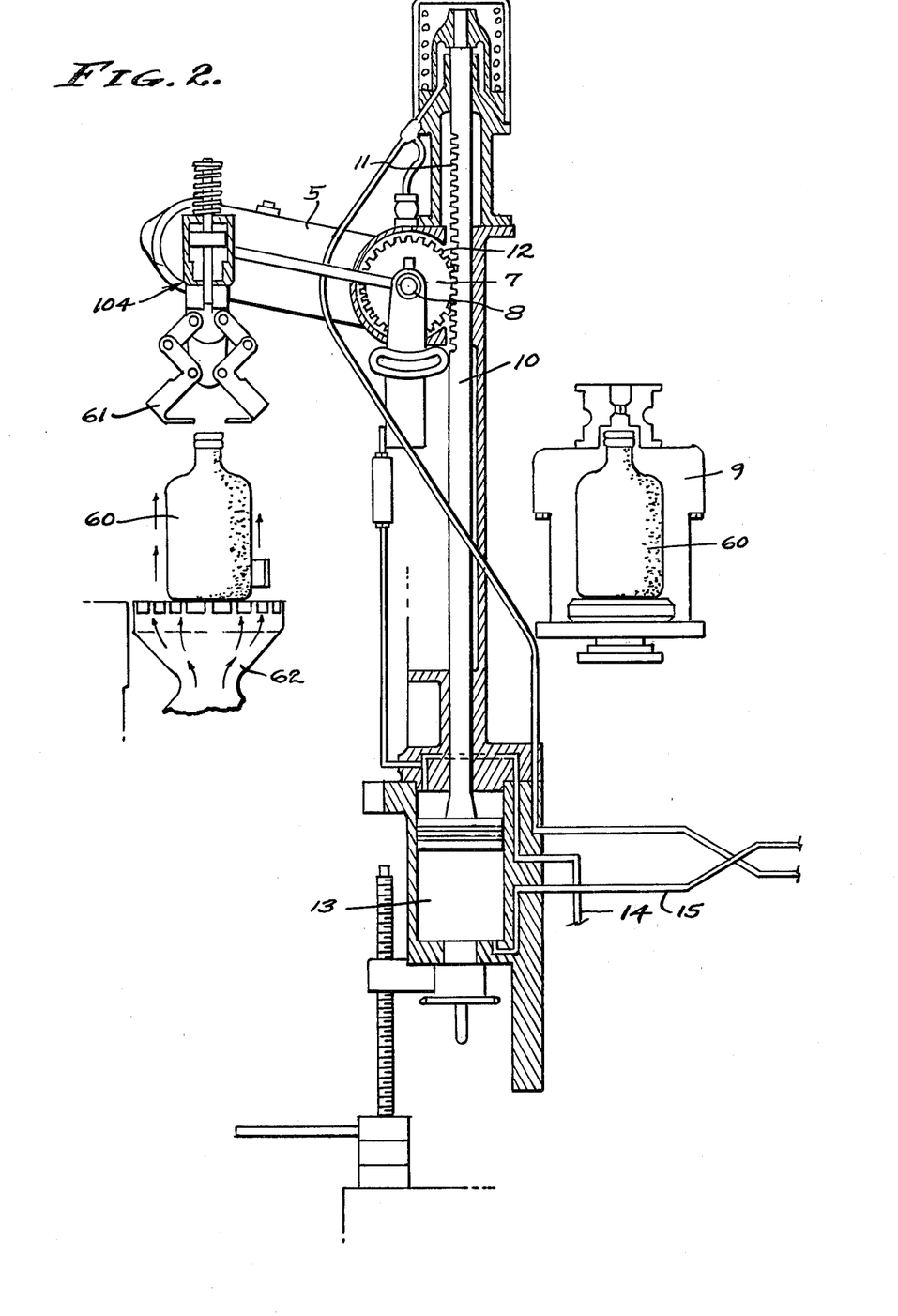
FIG. 2 is an elevational view, partly diagrammatic and partly in section of a takeout mechanism of an IS forming machine for glassware articles, which includes the mechanism regulated by the control system of the present invention.

Referring now in particular to FIG. 2 of the drawings, a takeout unit is illustrated for a type IS machine for forming glassware articles, said machine being of the well known type which comprises a blow molding station which includes the blow mold 9 previously described within which the glassware article 60 is fabricated from the parison 3. The takeout mechanism also includes a takeout arm 105 equivalent to the reversing arm 5 and which comprises a gripping actuating mechanism 104 for manipulation of the grippers 61 in a well known manner, which need not be described in detail as it is not considered part of the novelty of the invention.

The grippers 61 are adapted to close around the neck of the glassware article 60 to convey it from the blow mold 9 to the dead plate 62, where it is cooled while awaiting an pusher mechanism (not shown) to transport same to the next stage in the process which could be annealing in a suitable furnace or an area for storage.

The takeout arm 105 is operated in a manner quite similar to that of the inverting arm 5 which is securely fixed to pinion 7 rotatable about shaft 8, said pinion being preferably provided with teeth 12 for engagement with the teeth 11 of rack 10, said rack being actuated by fluid actuator 13 through fluid inlet 14 and outlet 15, all of the aforesaid being similar to the inverting mechanism previously described and for that reason the description of the same is not repeated herein in order to eliminate repetitious matter.

The movement control system means of the present invention will now be described in terms of the inverting mechanism of a type IS machine for manufacturing glassware articles, but it should be understood that the same principles are involved in the application of this control system means for the takeout mechanism of the glassware articles of said machine.

It is well known that in the type IS machine of former technology all of these movements are made with practically no control and only by reception of inverting and reversing signals or the feeding or takeout signals in the case of the takeout mechanism and the reception of a stop signal which normally occurs in a predetermined interval prior to termination of the movement in order to change the direction of fluid in the actuator 13, in such a manner that the mechanism is stopped to avoid an undesirable velocity at the end of the movement. This type of control does not achieve acceleration or deceleration of the mechanism in a smooth manner for avoiding distortion of the parison 3 in the inverting movement and furthermore it does not achieve a stopping action of the inverting arm 5 at zero speed in any of its positions for avoiding the final impact of the arm when it arrives at its terminal position either in the inverting or the reversing movement.

The control system means of the present invention which is more clearly illustrated in FIG. 2 of the drawings comprises essentially the gear 7 which rotates about the shaft 8, to which a movement state sensor SPA is coupled for transmitting a signal every certain number of degrees of rotation of the shaft 8, for example 3° for each signal, in order that said signal can be fed through an electrical conductor 19 to a microprocessor or microcomputer 22, which can be either independent of or formed as an integral part of the data processor which is a part of the electronic timing control system of the glassware forming machine.

The gear 7 has teeth 12 meshing with teeth of the rack 11 which extends from piston rod 10 of fluid driven piston 16 functioning within an actuator cylinder 13 comprising two fluid chambers 17 and 18, supplied with fluid through conduits 14 and 15, whereby in the illustrated form of our invention the fluid may be air, it being understood that any type of fluid such as gas, liquid or hydraulic fluid such as oil or the like may be used and be considered within the scope of the present invention.

In communication with the chamber 17, which is the braking chamber of the inverting mechanism illustrated in FIG. 1, a pressure sensor SP1 is installed to send continuous pressure signals through the conductor 20 to the microprocessor 22, and in communication with the chamber 18, which is the driving chamber of the inverting mechanism for imparting the inverting movement, a pressure sensor SP2 is installed which sends continous pressure signals through conductor 21 to the microprocessor 22 which is programmed by an adequate equation which takes into account the form and/or parison 3 factors which are formed by the blank mold 1, as well as the pressures in the chambers 17 and 18 and the position of the mechanism, transmitted at predetermined number of degrees of rotation by means of the angular position sensor through the conductor 19, to produce a sequence of inverting movements which are in accord with the equation which has been incorporated in the microprocessor 22 by means of adequate programming of the same, which it is deemed unnecessary to describe herein as it is well known. The inverting movement is achieved by means of a viscoelastic predetermined equation, producing an accelerated speed in a regulated manner from zero until a predetermined maximum, from which a decelerated speed is effected until zero speed is attained at the end of its movement, and the position indicated by dotted lines in FIG. 1 of the drawings is reached.

The fluid actuator 13 is connected to a pressure source P31, electronically regulated and controlled through a conduit 15 which varies the source pressure according to the requirements of the glassware article being handled by means of conduit 32 which is regulated by the closing valve 33 actuable between its closed position as indicated in the diagrammatic block view at 34, and its opened position as indicated in the diagrammatic block view at 35, a solenoid 37 functioning against the action of the spring 36 fixed to an integral part of the machine. The pressure source which introduces fluid to the actuator 13 continues through conduit 39 toward a directional valve 40, operable between its cross flow position indicated by the diagrammatic block 41 and its direct flow or parallel position indicated by diagrammatic block 42, such bidirectional displacement being achieved by means of actuation of two solenoids 43 and 44, which actuate the valve 40, and which will be described in greater detail hereinafter.

Depending on the position of valve 40, the fluid in conduit 39 passes to any of conduits 14 or 15 preparatory to entering any of the chambers 17 or 18 of the fluid actuator 13 to move piston 16 in the desired direction.

One or the other conduits 14 and 15 will be used as a discharge conduit for the chambers 17 or 18, and said discharge by means of valve 40 will cause the fluid to circulate from the corresponding chamber to the conduit 47 which leads to the digital valve 48, having eight operating bits 49, which provides a considerable large plurality, that is, 256 valve positions between the totally opened position and the totally closed position, thus providing adequate regulating of the fluid discharge in conduit 47, to conduit 51 and to the atmosphere through an adequate conduit 52.

The microprocessor 22, which receives signals from sensors SPA, SP1 and SP2, processes by a viscoelastic equation the movement permanently contained in its memory, and also by the control board 27 which will be described in detail hereinafter, such signals in accord with the equation above mentioned, operate the interface card 24 which by means of solid state relays 25 control the solenoids 37, 43 and 44 through signal conductors 38, 45 and 46 respectively, and the microprocessor also controls the digital valve 48 and its bits 49, through the logic circuit 50 illustrated in FIG. 3 of the drawings.

The control board 27 transmits and receives signals through logic circuit 26 to the interface card 24, from said interface card, and interchanges information through logic circuit 23 with the microprocessor 22 for the purposes as indicated hereinafter. The control board 27 which may be integrated with or separate from the timing control system of the previously mentioned machines, contains three digital switches 29, of the thumbwheel type, by means of which the operator sets the inversion times of the mechanism composed of the arm 5 and the crown 4, and a digital display 30 with two series of three digits, which receives and reads out the information introduced by the operator through digital switches 29 to set the required inverting timing in accordance with the glassware article being produced by the glassware article forming machine.

Furthermore, said control board 27 has a switch key 28 capable of setting the system in any one of two positions, that is, the information readout position or the operating position of the electronic control system of the present invention.

In this manner the operator, by means of the digital switches, can feed in the time required for the inverting step as well as the forming factor, in accordance with the type of glassware article being formed, and by moving the switch key 28 to readout position the operator can check that the inverting time is being read correctly, that is, the operator can check the setting introduced by movement of the digital switches 29, so as to determine what to correct as it would appear at all times on the digital display 30.

The time will be given in hundredths of a second and consequently can be given up to 999 hundredths of a second as the maximum time for the inverting step, by means of the control board 27 of the system of the present invention. With the switch key 28 moved to the readout position the setting of the time is checked when the switch key is moved to the operating position preparatory to the reception of an inverting signal which will be sent to the microprocessor 22, which is a part of or separate from the timing system of the machine, or if the microprocessor receives a corresponding signal from the timing system.

Upon receipt of the operation commencement signal for inverting, the relay system 25 actuated by moving the switch key 28 to the operating position and operated by the interface card 24, a signal is sent through conductor 38 to the solenoid 37 to close the same and changing valve 33 to its open position shown at 35, for reception of the flow of liquid from the pressure source P31 through conduit 32, passing through block 35 of the valve 33, and the conduit 39 to the directional valve 40. At the same time the solid state relays 25 will send a signal to solenoid 43, through conductor 45 to close valve 40 and move into position 42 directly, whereby the fluid coming from conduit 39 passes through the valve 40 and from there to conduit 15 to increase pressure to the chamber 18 thus causing the piston 16 to be elevated, and by movement of the piston bar 10, the gear 7 and the shaft 8 will be rotated, at precisely which moment the movement state sensor SPA commences to send retransmitted signals through the conductor 19 to the microprocessor 22, in order to adequately regulate the movement of the machine as will be described hereinafter. The fluid in chamber 17 of the actuator 13 will therefore be discharged through the conduit 14 to the valve 40 from whence it will pass through conduit 47 to the digital valve 48 which functions by means of its eight operating bits 49 from signals transmitted by logic circuit 50 having solid state relays suitably controlled by the microprocessor 22, in response to the position and pressure signals transmitted through conductors 19, 20, and 21.

Thus, opening and closing of the valve 48 will depend on the equation involved for allowing the fluid to discharge with more or less velocity through conduit 51 to the outlet 52.

The control system means of the present invention, inasmuch as it is duly regulated by three sensors, namely the movement state sensor SPA, and the pressure sensors SP1 and SP2 has an absolute assurance of its performance at all times that the digital valve 48 is regulated prior to the movement of the piston 16 in a manner as hereinafter described.

The microprocessor is programmed with an autoregressive function, in such a manner that by means of signals received through the conductors 19, 20 and 21, the microprocessor 22 and the interface card 24 calculate with anticipation the times that each movement of the inverting mechanism requires to transmit the appropriate signal through the logic circuit 50 to the digital valve 48, in order that the equation be followed with absolute accuracy, whenever the mechanism is in a predetermined position and the valve 48 is at predetermined port position, inasmuch as said valve has an approximate 15 millisecond time delay response, and inasmuch as the control is transmitting the signal in advance, the pressure on the exhaust line 14 is already advancing due to the fact that valve 48 is at the proper port position to the following partial movement when the mechanism arrives at a predetermined position.

Figure 3:
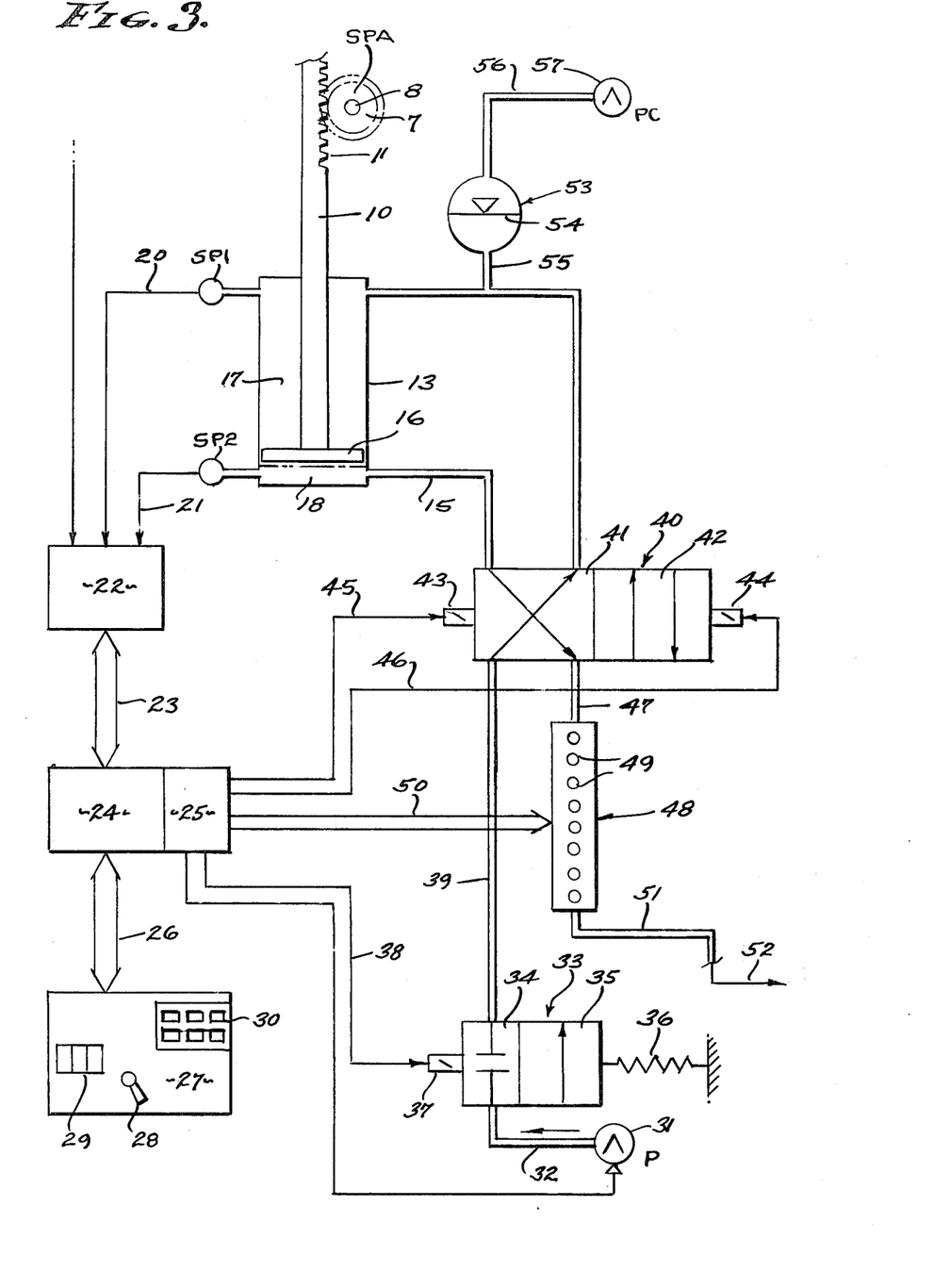
FIG. 3 is a flow diagram of the control system constructed in accordance with the present invention.

It follows, therefore, that the acceleration provided by chamber 18 can be controlled when reaching a predetermined number of degrees of movement, and at this moment the entry of fluid to the chamber 18 is terminated by transmission of a signal to solenoid 37 for closing valve 33 in its position 34 indicated in FIG. 3 of the drawings, by means of which the remaining movement of the piston 16 is regulated by the counterpressure exerted in the chamber 17 by valve 48 and its several openings whereby the piston 16 is stopped and consequently so is the inverting mechanism, until a practically zero speed is reached at the end of its movement.

Although the mechanism of the present invention is very efficient to reduce the speed to zero at the end of the inverting movement and to control such movement through a predetermined movement equation, as a preventative measure, a fluid damper 53 is preferably included in the mechanism of the present invention, said damper being connected to the discharge conduit 14 of the inverting mechanism through a conduit 55, said damper having a diaphragm 54, above which is a fluid cushion feed conduit 56 from a pressure control source PC57, whereby, should the valve 48 fail for any reason at the end of the inverting movement, the damper 53 set to a predetermined pressure, by means of its diaphragm 54 will exert a predetermined counterpressure in the chamber 17 in order to partially stop the piston 16, and movement dampened by the fluid cushion created in the damper 53, thus providing 100% assurance that zero speed is achieved at the end of the movement stage, thus avoiding any impact on the mechanism, particularly upon actuation in the inverting mode, and thereby avoiding damage to the mechanism as well as distortion of the parison conveyed by crown 4.

Once the inverting movement is terminated, the microprocessor 22, either directly or through the reception of a signal from the timing system of the machine, transmits another signal to the solenoid 37 through the conductor 38, opening the valve 33 to cause the fluid to pass from the pressure source P31, through the conduit 32, crossing valve 33 and through the conduit 39, toward the directional valve 40, that also receives a signal from the microprocessor conductor 46, to close the solenoid 44 and actuate the valve to its crossed position 41, whereby the fluid from conduit 39 crosses through conduit 14 to the chamber 17, causing piston 16 to descend and actuate by means of the rack 11 on pinion 7, and causing reverse movement of arm 5 and crown 4, to position them again as shown by solid lines indicated in FIG. 1 of the drawings.

With this movement just described the digital valve 48 actuates only to perform the braking at the end of the movement, at all times it not being important to follow an equation of a special type, inasmuch as in the case of reversal, it is not necessary to be careful with the parison as the mechanism is returning unloaded and consequently it is only necessary to avoid damage to the mechanism itself due to any impact at the end of its movement. It can be achieved by the exertion of the proper counterpressure through the digital valve 48 to produce a cycloidal movement profile at all times that said valve does not require gradual changes in its bits 49, and may be closed rapidly during the movement in order to ensure that there is no impact on the mechanism.

In the event of some regression it is not necessary to use a damper of the type of damper 53 connected to conduit 15, although this could be employed in order to achieve maximum security for the mechanism.

Figure 4:
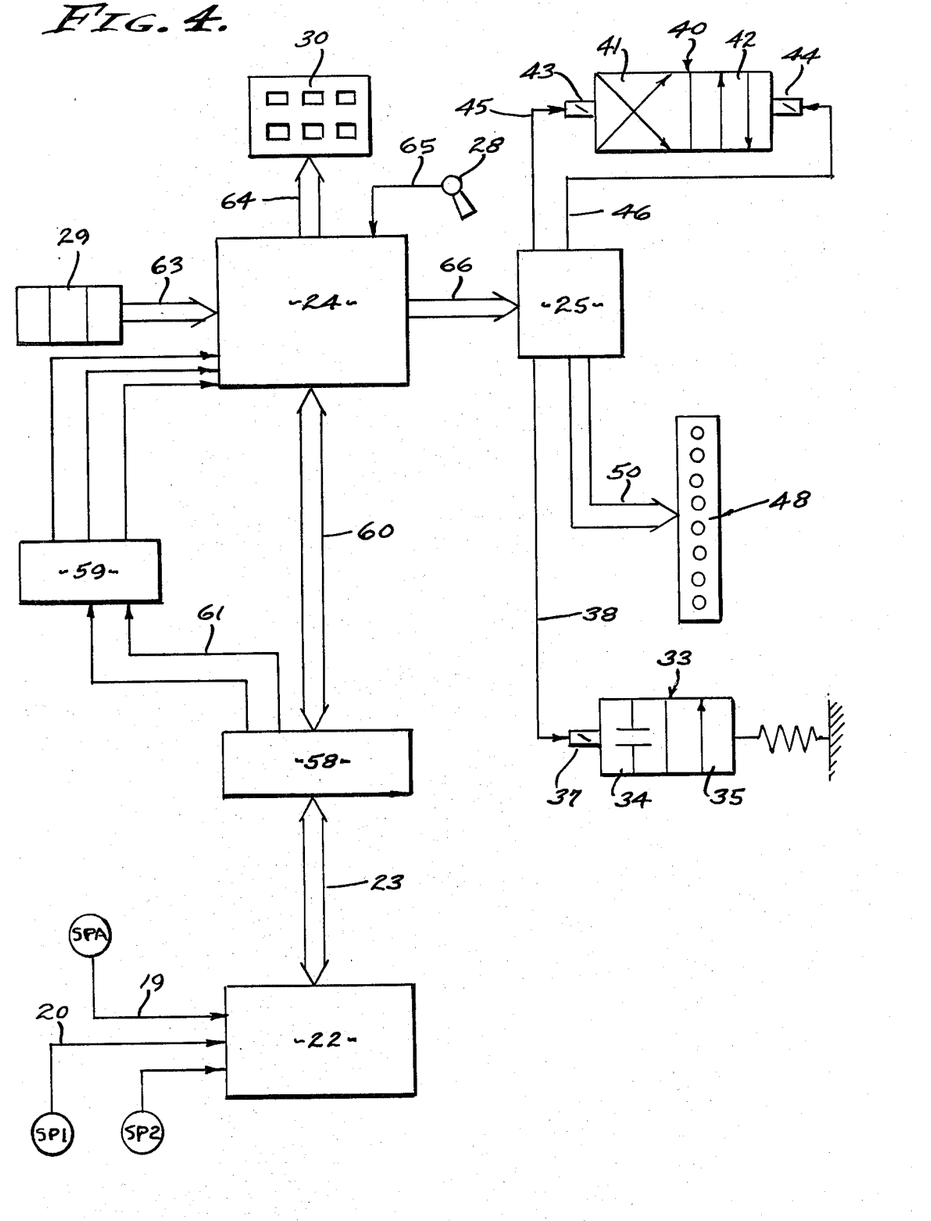
FIG. 4 is a block flow diagram indicating in detail the electronic control system constructed in accord with the present invention.

The interface card and its interrelation with the control system of the present invention can be seen more clearly in FIG. 4 of the drawing, in which said interface card has been shown in detail with its essential components.

In FIG. 4 of the drawings it can be seen that the three sensors SPA, SP1 and SP2, feed signals through their respective conductors 19, 20 and 21 to the microprocessor 22, which transmits logic signals through circuit 23 to position means 58 which is connected through conductors 61 to a decoder 59 which feeds signals through conductors 62 to the interface card 24 which comprises a three state bus as clearly illustrated in FIG. 4 of the drawings.

The interface card 24 also receives logic signals from the position means 58 through circuit 60. The digital switches 29 send digital signals through conductor 63 to the interface card or bus 24 which also receives signals from the control switch key 28 through conductor 65. The interface card sends signals through conductors 64 to the digital display 30 of the control board and also sends logic signals through circuit 66 to the solid state relays 25 which actuate the solenoids 37, 43 and 44 as previously described to operate the closing valve 33 and the directional valve 40, as well as to send digital signals through logic circuit 50 to the digital valve 48 for the purpose hereinbefore described.

It will be clearly apparent to those skilled in the art that what has been hereinbefore described is identically applicable to the takeout mechanism illustrated in FIG. 2 of the drawings, as the inverting movement of the inverting mechanism described in connection with FIG. 1 is precisely similar to the takeout arm 105 which compares with the inverting arm 5, whereby all which has been described in relation to the inverting mechanism applies precisely to the takeout mechanism as to the movement control of the takeout arm 105, when it carries the glassware article 60 and when it reverses and returns empty.

It is therefore not considered necessary to repeat all which has been specified heretofore since it should be obvious that the operation of the control of the present invention is equally applicable to the inverting and takeout mechanisms of a type IS forming machine for glassware articles.

It should be appreciated that, for the first time, insofar as we are aware, there has been provided an electronic control system means employing a digital valve in the discharge line of a fluid actuator which operates an inverting mechanism or the takeout mechanism, which can be actuated by following a viscoelastic equation which allows decreasing to a minimum the stress on the glassware article being formed and which ensures that the inverting or takeout movements are performed with the proper acceleration or deceleration for each type of article by the feeding of the form and desired time of inversion or takeout factor, thus eliminating the impact on the inverting or takeout mechanism as movements of said mechanism is reduced to practically zero velocity upon approaching the final positions of their movements.

What has been described represents a considerable improvement with respect to the available controls and mechanisms in the machines of prior art technology in which only the inverting or takeout movements were performed with natural acceleration and with uncontrolled deceleration due to the actuation of the counterpressure of the fluid actuator, but such counterpressure was not completely regulated, whereby movement was accomplished by following an available equation for the type of article being handled and therefore this resulted in preforms which were inefficiently produced, and the finished glass articles were frequently rejected because of deficiencies in structure, and a large percentage of imperfections and breakage.

The autoregressive model of the electronic control system means of the present invention provides for advance transmission of signals to the digital valve in order to provide advanced control of the movement equation to ensure absolute accuracy.

Although the hereinbefore description calls for certain modes of the invention is should be understood that it is possible to make certain modifications and therefore we do not wish to be restricted to what has been described but reserve all rights to such changes as fall within the scope of this specification and the claims which follow.

What we claim is:

1. A system for controlling the state of movement and operating fluid pressure of a rotary article conveying mechanism in glassware forming machines, including a rotatable transporting arm, a rotatable shaft on which said transporting arm is mounted, a glassware article handling mechanism carried by the free end of said transporting arm, an initial movement station and a terminal movement station between which the transporting arm carries an article of glassware to be formed, the improvement comprising a pinion carried by said shaft, a rack engaging said pinion, a piston rod extending from one end of said rack, a double-acting dual chamber fluid actuator for moving said piston rod to actuate the rack and pinion and shaft to move the transporting arm between its two stations, an intake and a discharge conduit for said actuator, a state of movement sensor mounted on said shaft to transmit intermittent position signals, pressure sensors for each of the chambers in the actuator, a control system means comprising a logic circuit to receive signals from the sensors of the state of movement and the chamber pressures, said logic circuit including a memory of a viscoelastic-cyloidal equation, a control panel including a mode of operation switch for transmitting signals of the mode of operation to said logic circuit, and a series of digital switches for transmitting to said logic circuit timing signals for transporting of the article being formed, a closure valve operated by a solenoid which receives signals from the logic circuit, a directional valve for determining the direction of movement of the fluid actuator, said directional valve receiving signals from the logic circuit, and a digital valve in the fluid actuator discharge conduit, the opening of said digital valve being constantly controlled by the logic circuit to regulate the discharge of fluid from the actuator in conformity with the viscoelastic equation and in conformity with the signals from said sensors of state of movement and pressure.

2. A system for controlling a rotary article conveying mechanism in glassware forming machines, according to claim 1, wherein said control panel includes digital indicia to exhibit the time signals of rotation of the transporting arm fed to the logic circuit by the digital switches, when the mode of operation switch is in one position, and when in the other position places the logic circuit in a state of alert to transmit the signal to initiate the movement of the transporting arm, followed by the viscoelastic equation for movement of the article transporting arm.

3. A system for controlling a rotary article conveying mechanism in glassware forming machines, according to claim 1, wherein said logic circuit includes a microprocessor which contains permanently in its memory the viscoelastic equation and has the capacity to regulate the operation of the mechanism in response to the retransmitted signals from the sensors of the state of movement and of pressure, an interface card which exchanges logic information with said microprocessor and with the control panel, and a relay unit which receives signals from said interface card and controls by means of electrical signals the solenoids of the closure valve and the directional valve, and controls the digital valve by means of logic signals.

4. A system for controlling a rotary article conveying mechansim in glassware forming machines, according to claim 2, wherein said logic circuit includes a microprocessor which contains permanently in its memory the viscoelastic equation and has the capacity to regulate the operation of the mechanism in response to the retransmitted signals from the sensors of the state of movement and of pressure, an interface card which exchanges logic information with said microprocessor and with the control panel, and a solid state relay unit which receives signals from said interface card and controls by means of electrical signals the solenoids of the closure valve and the directional valve, and controls the digital valve by means of logic signals.

5. A system for controlling a rotary article conveying mechanism in glassware forming machines, according to any one of claims 1, 2 or 3, wherein the digital valve includes a signal generating circuit of eight bits for regulating the opening of said digital valve to 256 positions between its open and closed positions.

6. A system for controlling a rotary article conveying mechanism in glassware forming machines, according to any one of claims 1, 2, 3 or 4, wherein the double acting fluid actuator comprises a fluid operated shock absorbing chamber whereby the transporting arm will reach its extreme of movement with a positive zero movement.

7. A system for controlling a rotary article conveying mechanism in glassware forming machines, according to any one of claims 1, 2, 3 or 4 wherein the double acting fluid actuator comprises a fluid operated shock absorbing chamber and a diaphragm which regulates the pressure to a predetermined value in the discharge conduit of the fluid actuator whereby the transporting arm will reach its extremes of movement with a positive zero movement.

8. A system for controlling a rotary article conveying mechanism in glassware forming machines, according to any one of claims 1, 2, 3 or 4, wherein said fluid actuator and closure and directional and digital valves are operated by a gas such as air.

9. A system for controlling a rotary article conveying mechanism in glassware forming machines, according to any one of claims 1, 2, 3 or 4, wherein the state of movement sensor transmits a signal each 3° of movement of the shaft on which the transporting arm is mounted.

10. A system for controlling a rotary article conveying mechanism in glassware forming machines, according to any one of claims 1, 2, 3 or 4, wherein the logic circuit of the control means implements self-regressive control for transmitting anticipation signals to the digital valve, whereby when the transporting arm reaches a predetermined position the digital valve senses the opening necessary for the following step of movement of the transporting arm by means of the equation contained in the logic circuit memory.

11. A system for controlling a rotary article conveying mechanism in glassware forming machines, according to any one of claims 1, 2, 3 or 4, wherein the rotatable transporting arm is part of an inverting mechanism, and wherein the logic circuit of the control means is programmed by means of the viscoelastic-cycloidal equation to control the inverting movement of the inverting mechanism when the reversing movement of the transporting arm, when not carrying an article, is only controlled by transmitting braking signals to the digital valve, which follow in the cycloidal type profile to impede the impact at the end of the reversing movement.

12. A system for controlling a rotary article conveying mechanism in glassware forming machines, according to any one of claims 1, 2, 3 or 4, wherein the rotatable transporting arm is part of a takeout mechanism, and the logic circuit of the control means of the viscoelastic-cycloidal equation controls the takeout movement of the takeout mechanism, and controls transmitting braking signals to the digital valve when the takeout mechanism is moved while empty, following the cycloidal type profile to impede the impact at the end of the movement of the takeout mechanism.

* * * * *